United States Patent [19]

Herbst et al.

[11] Patent Number: 4,630,971

[45] Date of Patent: Dec. 23, 1986

[54] APPARATUS FOR ANCHORING ROCK AND THE LIKE

[75] Inventors: Thomas Herbst, Wessling; Lorenz Schitzler, Pöcking, both of Fed. Rep. of Germany

[73] Assignee: Dyckerhoff & Widmann Aktiengesellschaft, Munich, Fed. Rep. of Germany

[21] Appl. No.: 823,055

[22] Filed: Jan. 27, 1986

[30] Foreign Application Priority Data

Jan. 30, 1985 [DE] Fed. Rep. of Germany ....... 3503012

[51] Int. Cl.$^4$ .............................................. E21D 20/00
[52] U.S. Cl. .................................... 405/260; 405/259; 411/69
[58] Field of Search .................... 405/260, 259, 261; 411/5, 9, 22, 23, 39, 69, 2-4, 40-43

[56] References Cited

U.S. PATENT DOCUMENTS

| 983,442 | 2/1911 | Haywood | 411/42 |
|---|---|---|---|
| 1,099,668 | 6/1914 | Rosenberg | 411/42 |
| 1,229,287 | 6/1917 | Kennedy | 411/69 |
| 4,112,637 | 9/1978 | Herbst | 405/259 X |
| 4,415,294 | 11/1983 | Ringe | 405/259 |
| 4,560,305 | 12/1985 | Powondra | 405/260 X |

FOREIGN PATENT DOCUMENTS

| 2515950 | 10/1976 | Fed. Rep. of Germany | 411/69 |
|---|---|---|---|
| 2751020 | 5/1978 | Fed. Rep. of Germany | 405/260 |
| 3145923 | 1/1983 | Fed. Rep. of Germany | 405/260 |

Primary Examiner—Dennis L. Taylor
Attorney, Agent, or Firm—Toren, McGeady, Stanger, Goldberg & Kiel

[57] ABSTRACT

An anchoring apparatus for insertion into a borehole in a rock stratum for supporting the rock surface or wall, such as in a rock tunnel or rock excavation, includes a tension member in the form of an axially elongated steel rod with force transmission ribs on its outer surface and an anchoring element, such an anchoring nut, engageable with the rod. The anchoring element has an inside surface with inwardly extending projections and the adjacent flanks on the projections form grooves within which the force transmission ribs engage. The anchoring element is formed of a higher strength material than the rod. When a predetermined axially extending tension force acting on the rod is exceeded, relative movement takes place between the anchoring element and the rod. The flanks on the projections on the anchoring element in contact with the ribs on the rod shear off a portion of the ribs contacted. Accordingly, while the predetermined force is exceeded, the shearing action proceeds and affords a sliding anchoring effect between the rod and the anchoring element.

27 Claims, 32 Drawing Figures

APPARATUS FOR ANCHORING ROCK AND THE LIKE

BACKGROUND OF THE INVENTION

The present invention is directed to an apparatus for anchoring a tension member, such as a rock anchor where the tension member is an axially elongated steel rod formed of one or more axially extending parts with force transmission ribs extending helically around the rod and forming at least a partial thread. Further, the anchoring apparatus includes an anchoring element attachable to one end of the anchor rod and supportable against the surface of the material into which the rod is inserted. The anchoring element, generally in the form of an anchor nut, has inwardly directed projections on its inside surface with the flanks of adjacent projections forming grooves into which the ribs on the rod extend. With the apparatus secured in a borehole, when a predetermined axially extending tensile force acting on the rod is exceeded, relative movement takes place between the rod and the anchoring element until the predetermined tensile force is again established.

Rock anchors are employed in mining operations for supporting rock surfaces within an excavated area. Hot rolled steel rods with helically extending hot rolled force transmission ribs on their outer circumference are particularly suitable as tension members for such anchors. Such ribs form a partial thread on which an anchoring nut or element can be screwed when the nut is provided with a corresponding counterthread. Due to the ribs, these steel rods, which can be formed from one or more axially extending parts, afford a good bonding action in the region where they extend into a borehole and are embedded in a synthetic resin adhesive or grout and act in the manner of a ribbed reinforcing rod. At the end of the rod extending from the borehole the anchoring element can be provided by screwing a correspondingly shaped anchor nut onto the end of the rod.

In deep excavations the pressure developed by the overburden is held temporarily only by rock anchors, while the overburden constantly deforms. Accordingly, deformations in the overburden must be permitted so that a new state of equillibrium can be established in the excavation. Such deformations, however, attain a degree of magnitude which far exceeds the extensibility of steel anchor members. As a result, rock anchors with yieldable anchoring elements on the end of the rod extending from a borehole are known. In such known rock anchors, relative movement between the rod and the anchoring element can be effected when a predetermined axially extending tensile force is exceeded until the force returns to a point below the predetermined level.

In a yieldable anchoring appparatus of the above type, the anchoring element is provided with recesses or grooves suitable for receiving the force transmission ribs on the anchor rod. The force transmission ribs have flanks on the rod surface inclined relative to the rod axis. The grooves in the anchoring element have similarly arranged flanks and the anchoring element is formed so that it can expand elastically in the radial direction transversely of the axis of the anchor rod. Accordingly, when the predetermined axially extending force acting on the rod is exceeded, the anchoring element is displaceable in a sliding manner along the rod over a certain distance, note the German Patentschrift No. 31 45 923. The anchoring element can be in the form of a nut where grooves are formed in the inside surface of the nut between adjacent projections affording a thread-like arrangement.

Aside from the fact that this known anchoring element is relatively costly to produce to ensure elastic expansion, the anchoring force alternates between a maximum and a minimum value, that is, when the rod is locked in place or when the tensile force overcomes the locking action and there is relative movement with the anchoring element expanding outwardly.

In another known flexible anchoring apparatus, the anchoring element is in the form of a steel sleeve with an anchor rod extending through it. The bore in the steel sleeve converges toward an anchor plate and is filled with a material in pellet form, such as steel balls and is closed, note German Patentschrift No. 27 51 020. When a tensile force acts on the anchor rod, the filler material within the borehole is grouted within the tapering annular space. As a result, high compression occurs at locations in the pellet-form filler material or between the material and the anchor rod with plastic deformation occurring in these parts so that relative displacement occurs.

Because the position of the pellet-form material in the borehole cannot be influenced, the anchoring force and the flexibility of the anchoring apparatus is not exactly determinable. Moreover, in addition to elastic deformation, plastic deformations take place which are necessary for the anchoring effectiveness, however, can lead to the reduction in the strength of the anchor rod. Finally, rock anchors are known in which a thread is formed on the end of the anchor rod extending out of the borehole and the thread projects out from the body of the anchor rod. By means of a member slipped onto the body of the anchor rod, such as a conically perforated member, which is supported at one end against the rock and at the other end on the threads projecting outwardly from the body, a yieldability is attained when the threads are deformed or sheared off consecutively.

Apart from the fact that the anchoring element must always be placed on the anchor rod in the direction of the end in the borehole, the anchorage cannot be provided from the outside of the borehole and the required tension of the rod cannot be adjusted. Another disadvantage of this anchoring apparatus is that the end of the rod provided with the thread is drawn through the anchoring member as through a drawing die so that there is no possibility of influencing the anchoring force.

SUMMARY OF THE INVENTION

The primary object of the present invention is to provide a yieldable anchoring apparatus of the above type where movement between the rod and the anchoring element can be effected which can be controlled as much as possible and affords a definable sliding resistance which is as uniform as possible so that the anchoring force is maintained as constant as possible.

In accordance with the present invention, the anchoring element is formed of a higher strength material than the material forming the anchor rod. Further, the flanks on the projections located on the anchoring element for effecting the transmission of force contact the force transmision ribs on the anchor rod over only portions of the rib surfaces so that if the predetermined axially extending tensile force acting on the rod is exceeded, portions of the force transmission ribs can be sheared or cut away to the extent that the flanks of the projections engage the ribs. Preferably, the anchoring element is in the form of a nut so that the projections form at least a partial thread and the grooves or recesses between the force transmission ribs on the rod are arranged to receive the at least partial threads in threaded engagement.

The invention is based on the supporting behavior of an anchor nut on an anchor rod provided with force transmission ribs extending along a helical line and forming a thread. If the steel forming the nut has a significantly higher strength than that of the anchor rod, the force transmission ribs on the rod are sheared off when a predetermined axially extending tensile force acting on the rod is exceeded and relative movement occurs between the rod and the nut. A standard nut could not afford the requirement for a constant sliding resistance. If such a nut were used as the anchoring element, then a point resistance would develop because all of the threads on the nut would engage the force transmission ribs on the anchor rod and would be stripped or sheared off. After the first shearing action the resistance would decrease very sharply because only one following force transmission rib would provide engagement with the nut.

The basic concept of the present invention involves using only partial surfaces for effecting the force transmission and in selecting the sum of the force transmission surfaces between the anchoring element and the ribs on the anchor rod or arranging the partial surfaces relative to one another so that the force transmission ribs on the rod are sheared off as uniformly as possible along its axis when the load acting on the rod exceeds a predetermined load, whereby the anchoring force is maintained as constant as possible. The magnitude of the anchoring force can be influenced not only by the dimensions and/or shape of the partial surfaces, but also by the length of the anchoring element, that is, the number of the projections and recesses cooperating with the force transmission ribs as well as by providing different material strengths for the anchoring element and the anchor rod.

Accordingly, the present invention involves two substanially equivalent basic embodiments. In one embodiment of the invention, the projections forming the consecutive threads on the anchoring nut, each of which forms a complete thread turn, increase in height relative to the base of the thread grooves in the direction of the longitudinal tensile force and with the flanks of the projection acting at the flanks of the force transmission ribs on the anchor rod which flanks are directed toward the load so that the force transmission ribs can be sheared off in a stepwise manner when the predetermined tensile force is exceeded.

With such an arrangement each thread on the anchoring nut, as viewed in the direction of the tensile force acting on the anchor, cuts or shears off another layer of the force transmission ribs on the anchor rod. This can be achieved in a simple manner with the anchor rod thread formed in a conical bore through the nut. Accordingly, the thread valleys in the nut, cooperating with the force transmission ribs on the rod in a screw thread manner, have the same depth with reference to the axis of the nut but a different depth with reference to the inner surface of the nut. Since the shearing force acting counter to the sliding of the nut relative to the rod depends on the respective shearing surface, with the shearing surface remaining constant, a constant sliding resistance can be produced.

The flanks of the projections on the anchoring nut can have the same or a steeper inclination than the flanks on the force transmission ribs on the anchor rod so that the ribs can be sheared off by edges located at the surface of the flanks on the projections which flanks are directed toward the load. In a preferred arrangement the flanks of the projections on the anchoring nut extend perpendicularly to the nut axis. These flanks, along with the inner surface of the nut, form cutting edges which ensure a problem-free shearing of the force transmission ribs at the desired height. Furthermore, the combination of the different flank constructions on the anchoring nut and the rod, with the projections on the inside of the nut formed along a conical surface, leads to a difference in pitch between the nut and the rod. As a result, the force transmission ribs on the anchor rod engage the nut one following the other after a certain displacement movement occurs. Therefore, an additional uniformity in sliding resistance is developed.

The flanks of the anchoring nut projections directed toward the load can be inclined in a flatter manner than the flanks on the force transmission ribs on the rod so that the ribs on the rod can be sheared by way of cold forming by the flanks on the projections. Such cold forming of the force transmission ribs results in a reduction of the rib height and in a widening of the rib base and even affords a certain amount of work hardening of the anchor rod.

Without forsaking the concept that the projections on the anchoring nut should form a complete thread, it is also possible to form the projections with interruptions between them. The interruption can be flush with one another in the direction of the axis of the nut. In such an arrangement, the partial surfaces available for force transmission can be dimensioned around the circumference of the force transmission ribs of the anchor rod so that a certain sliding force is obtained. In this way it is possible to compensate for tolerances developed during the rolling of the rods by using an anchor rod with wide interruptions for a rod with high ribs, or vice versa.

In the second basic embodiment of the invention instead of varying the heights of the projection in the anchoring nut, individual projections can be provided offset relative to one another in the circumferential direction so that the means for force transmission between the anchor rod and the anchoring nut are located only at certain positions in the thread-like direction. In this embodiment of the invention, the projections on the anchoring nut are in the form of cams located along a helical line on the inside of the anchoring nut and mutually spaced from one another forming a partial or interrupted thread. The flanks on the cams directed toward the load and/or the lateral surfaces of the cams then act on the force transmission ribs on the rod, which ribs form complete threads, whereby the force transmission ribs can be sheared off along the dimension in contact with the cams when the predetermined axial tensile force is exceeded. The cams are preferably spaced uniformly along the helical thread line of the anchoring nut. The cams forming consecutive threads can be offset relative to one another in the circumferential direction. Accordingly, it is assured that during axial sliding movement of the rod relative to the anchoring nut over the axial dimension of a rib, the following thread of the anchoring nut strikes against a part of a rib on the anchor rod which has not yet been sheared off by the preceding thread on the nut. If the cams are offset relative to one another in such a way that they appear next to one another in the normal projection of the anchoring nut, then, as viewed along the length of the anchoring nut, the cams shear off completely the force transmission ribs of the anchor rod.

To make the sliding resistance more uniform, it is advisable to offset the cams relative to one another along the helical line formed by the cams, in the axial direction of the anchoring nut preferably with the spacing between the cams being the same. With this arrangement, all of the cams along a thread of the anchoring nut do not act on the force transmission ribs of the anchor rod at the same time, rather the cams act in a serial fashion due to the extent of the offset between them. A particular uniformity in the sliding resistance is achieved when the cams are offset relative to one another by cumulative amounts within the thread pitch of the nut.

It should be evident that a variety of geometric arrangements of the cams is possible as long as the threading ability is assured. Thus, the cams can have lateral surfaces inclined relative to the axis of the nut and the cams can also be formed in a wedge-shaped manner.

An advantageous feature, applicable to the two basic embodiments of the invention, is that the provision of the height variations in the projections on the anchoring nut and the spacing of the individual cam projections relative to one another, can be effected in an anchoring nut formed of at least two parts, each of which can be threaded. These parts are located on the anchor rod in spaced relation to one another and are not rotatable relative to one another. The parts are spaced in the axial direction of the nut by a predetermined amount so that when the predetermined tensile force is exceeded, they provide a force locking engagement with the anchor rod in a serial manner.

The offset arrangement of the cam projections on the anchoring nut can be effected for spaced engagement without impairing the threadability of the individual parts of the anchoring nut with respect to the anchor rod. Therefore, it is possible to superimpose the sliding resistance effected by the two parts, which sliding resistance for each part is approximately sine-shaped, whereby the crest of the sine-shaped curve for one is fully effective, while the wave trough for the other is effective with the sliding force being maintained uniform. In addition to the fact that the nut part cannot be screwed during the time period of its effectiveness, it cannot be accidentally loosened.

The separate nut parts can be secured together so that they rotate as a unit but are axially displaceable relative to one another. In one arrangement, the parts of the anchoring nut can have a non-circular outer contour, such as a hexagonal shape, and can be enclosed within a sleeve with a corresponding cross-section. In addition, the nut parts can be connected together by an intermediate piece which prevents any relative rotation but permits the axial displacement of the parts.

Another advantage of the anchoring apparatus embodying the present invention is that it is maintenance-free. As a result, it can be located not only on the end of the anchor rod extending out of a borehole in a known manner and supportable against an anchor plate, but it can be countersunk in the borehole opening and it can even be secured on the end of the anchor rod within the borehole and embedded within the borehole in a bonding material. With the anchor member located within the borehole there is the advantage that the yieldability of the anchoring apparatus does not require a projection outwardly from the surface in which the borehole is formed.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
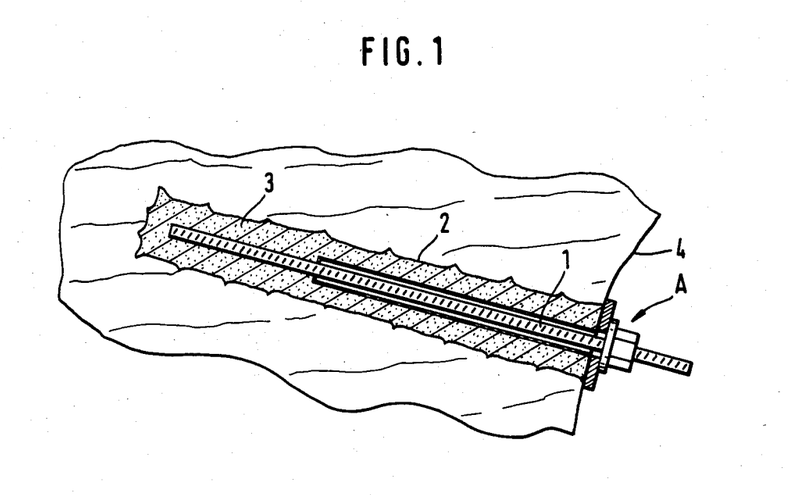
FIG. 1 is an axially extending sectional view through a rock anchor with the anchoring apparatus mounted on the exterior of the borehole.

FIG. 1 displays an axially extending sectional view through a rock anchor including an anchor rod 1 inserted into a borehole 2. The anchor rod 1 extends almost completely to the base of the borehole 2 and the borehole is filled along its entire length with a hardenable material 3 with the inner end of the anchor rod 1 being secured by the hardenable material, such as grout, along a given dimension. A pipe sleeve laterally encloses the anchor rod 1 from the opening into the borehole to a point spaced between the borehole opening and the base of the borehole. The anchor rod 1 is freely extendible along its length within the sleeve. At the outside of the borehole an anchoring apparatus A is arranged to support the surface of the rock in which the borehole is formed. The anchoring apparatus A is described in the following text in a number of different embodiments.

Preferably, a hot rolled steel rod with hot rolled force transmission ribs 5 on its outer surface is employed as the anchor rod 1. The ribs are located along a helical line and are positioned on the opposite sides of the rod and extend only along a part of its circumference, in other words, the ribs form a partial or interrupted thread. An anchoring nut 10 with a corresponding internal thread can be screwed onto the partial thread formed on the anchor rod 1. With the anchor rod 1 secured within the borehole 2, the anchoring nut 10, as shown in FIGS. 1-4, is threaded onto the end of the rod extending out of the borehole and the nut holds an anchor plate 7 against the rock surface 4 to provide support for the rock which has a tendency to move.

Figure 2:
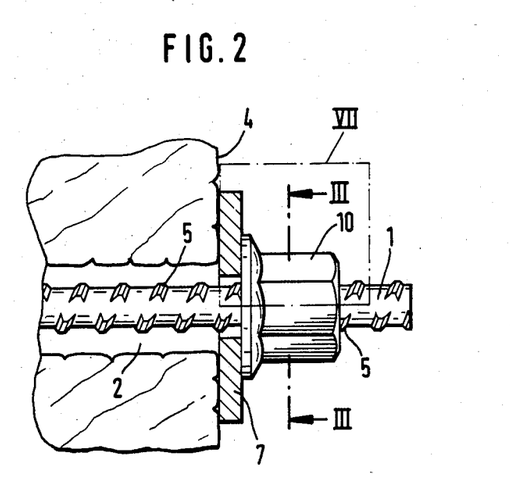
FIG. 2 is an enlarged partial axially extending sectional view of the anchoring apparatus.
Figure 3:
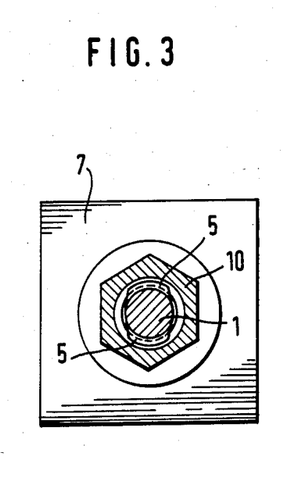
FIG. 3 is a sectional view taken along the line III—III in FIG. 2.
Figure 7:
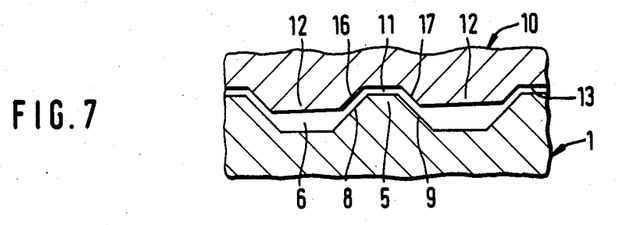
FIG. 7 is a partial axially extending sectional view illustrating the cooperation of projections on an anchoring nut with force transmission ribs on an anchor rod embodying the present invention.

In FIGS. 7 to 10, an embodiment of the anchoring apparatus according to the present invention is displayed on an enlarged scale illustrating the detail VII indicated by dashed lines in FIG. 2. FIG. 7 sets forth the engagement of the thread in the anchoring nut 10 with the ribs 5 on the anchor rod in a considerably enlarged partial axial section.

As indicated chiefly in FIG. 7, the oppositely directed flanks 8 and 9 of the force transmission ribs 5 on the anchor rod 1 are inclined obliquely relative to the axis of the rod. The inside surface of the anchoring nut 10 has valleys or recesses 11 corresponding to the ribs 5 on the anchor rod 1 and the valleys or recesses are defined between lands or projections 12 on the inside surface of the nut. Flanks 16 and 17 on the projections 12 have an inclination corresponding to that of the flanks on the ribs whereby the ribs fit into the recesses 11 with the projection 12 extending into the corresponding grooves formed between the flanks of the ribs 5. The base of the valleys 6 between the ribs 5 correspond to the surface of the rod core.

Figure 8:
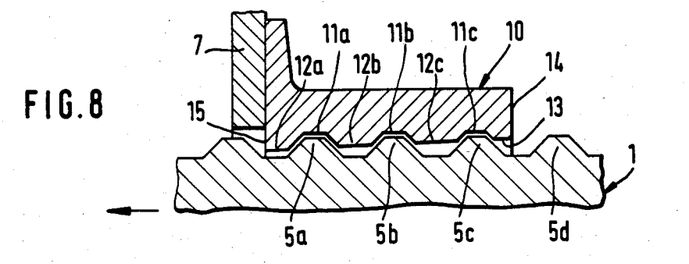
FIGS. 8 to 10 are views similar to FIG. 7 and illustrating different phases of the yieldability of the anchoring apparatus displayed in FIG. 7.
Figure 9:
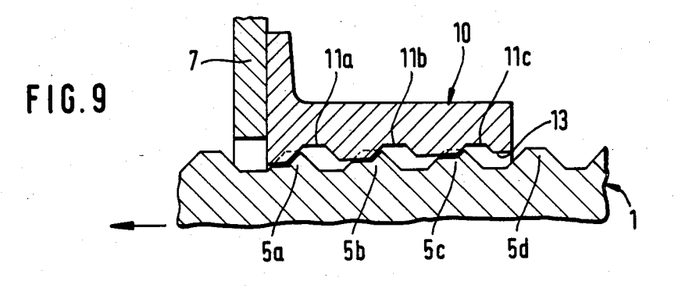
Figure 10:
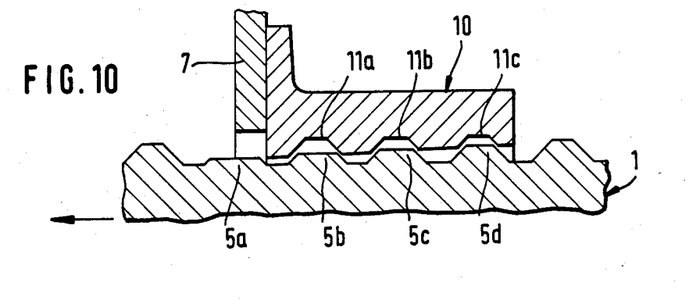

As can be seen in FIGS. 8, 9, and 10, the inside surface 13 of the anchoring nut 10 extends conically so that the inside diameter of the nut is greater at its end spaced from the anchor plate 7 than the end of the nut located at the anchor plate. The force direction of the anchor rod 1 is indicated by an arrow in FIGS. 8, 9, and 10. Due to the conical shape of the inside surface 13 of the anchoring nut 10, the recesses 11a, 11b, and 11c have different depths so that the edges formed by the flanks 16 of the projections 12 and the inner surface 13 of the nut act on the load-directed flanks 8, that is, the flanks 8 facing in the force direction, so that different radial dimensions of the projections have different partial surfaces in contact with the ribs.

FIG. 8 displays the start of the deformation of the anchor rod 1 after the anchoring nut 10 is attached. As the axial tensile force acting on the anchor rod 1 increases, the flanks of the projections 12a, 12b, and 12c of the nut adjacent to the flanks 8 of the ribs 5a, 5b, 5c of the anchor rod 1 effect a plastic deformation of the ribs, that is, a shearing off of a portion of the ribs along the shearing surfaces, as indicated in FIG. 9. For a better appreciation of the deformation, the material of the ribs which is displaced is not illustrated.

FIG. 10 illustrates the condition of the ribs 5a, 5b, 5c, 5d on the anchor rod 1 after the nut has been axially displaced relative to the rod 1 by the pitch of the thread. As a result, recess 11a is located opposite rib 5b, recess 11b is located opposite rib 5c, and recess 11c is located opposite rib 5d. in FIGS. 7-10, there is shown the commencement of the deformation of the ribs 5a, 5b, 5c, and 5d of the anchor rods with a different layer thickness being cut off or shaved off the ribs on the anchor rod 1. While these Figures indicate the initial deformation of the ribs, additional deformations follow in a similar manner during continuous relative movement of the nut with respect to the anchor rod 1.

Figure 11:
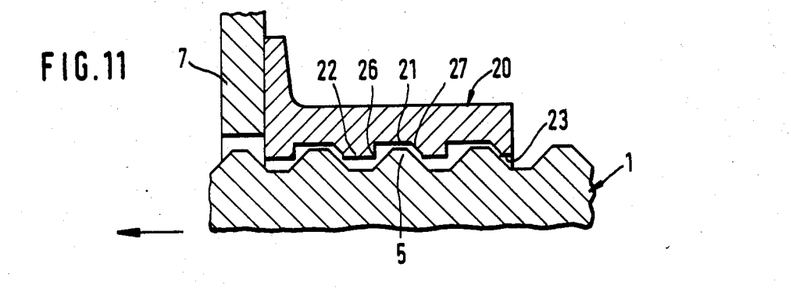
FIGS. 11 and 12 are partial axially extending sections through two different embodiments of an anchoring apparatus incorporating the present invention.

To improve the shearing action of the anchoring nut 20, as shown in FIG. 11, the flanks 26 of the lands or projections 22 can be disposed perpendicularly to the axis of the anchoring nut at least on the side facing the load, that is, the flank opposite to the flank 8 directed toward the load. The flanks 26 along with the inside surface 23 of the nut 20 form cutting edges which ensure a problem-free shearing off of layers of the ribs 5 at the different heights. The opposite flanks 27 of the projections 22 on the nut 20 are remote from the load and they can be inclined in the same manner as the flanks on the ribs 5 of the anchor rod 1 to ensure a problem-free screwing on in the region of the recesses 21 in the inside surface of the nut.

When the core diameter of the nut increases conically outwardly from the borehole, the combination of the differently formed flanks on the thread of the rod as compared to the flanks on the nut leads to a pitch distortion, even at the same pitch. Accordingly, all of the ribs 5 are not engaged by the nut at the outset, note FIG. 8, rather, engagement between the projections 22 on the nut 20 take place consecutively only after a certain amount of axial displacement occurs. This can be appreciated from FIG. 11 where the rod 1 with the rib closest to the anchor plate 7 is almost contacted by the radially inner cutting edge of the nut, while the other ribs on the rod 1 are more remote from contact. Due to this arrangement, a further uniformity of the sliding resistance is attained.

Figure 12:
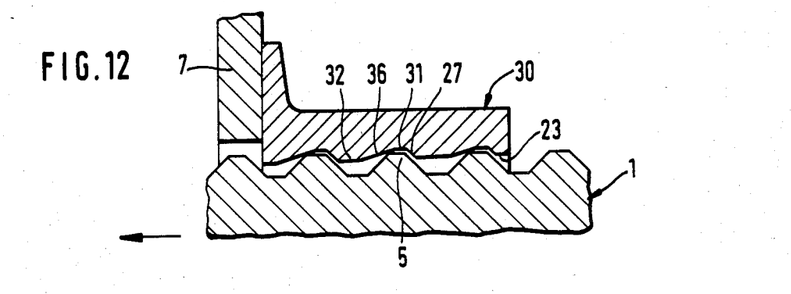
Figure 13A:
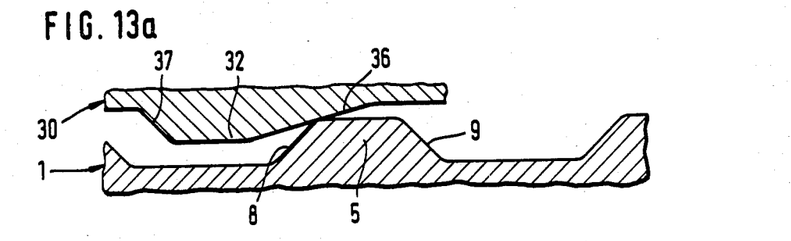
FIGS. 13a and 13b are axially extending sectional views of the arrangement illustrated in FIG. 12 on an enlarged scale.
Figure 13B:
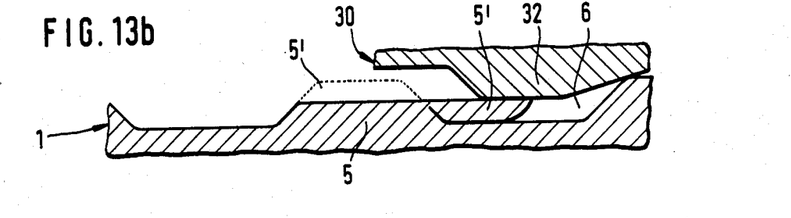

Deformation of the force transmission ribs on the anchor rod comparable to a flow process is effected with the arrangement of the anchoring nut 30 illustrated in FIGS. 12, 13a and 13b, with the flanks 36 on the projections 32 which effect the deformation of the ribs being provided with a flatter inclination relative to the inclination of the corresponding flanks 8 on the force transmission ribs 5 of the anchor rod 1. The flanks 37 on the projections 32 facing in the same direction as the flanks 8 are inclined in the same manner as the flanks 9 of the ribs 5 on the rod 1 to ensure the effectiveness of the screwing process.

The deformation of the ribs 5 by the nut 30 is set forth on an enlarged scale in FIGS. 13a and 13b. In these Figures it can be noted how the very flat flank 36 of the projection 32 on the anchoring nut 30 acts on a rib 5 of the anchor rod 1 approximately in the manner of a drawing die so that by a cold forming operation, partial hardening takes place while the radially outer portion 5' of the rib 5 is sheared or stripped, note the dotted lines shown in FIG. 13b, with the material stripped from the rib being displaced into the adjoining thread valley 6 in the anchor rod. As a result, the shearing contact surface between the nut and the rod is simultaneously lengthened whereby the friction force acts over an increased axial length.

Figure 14:
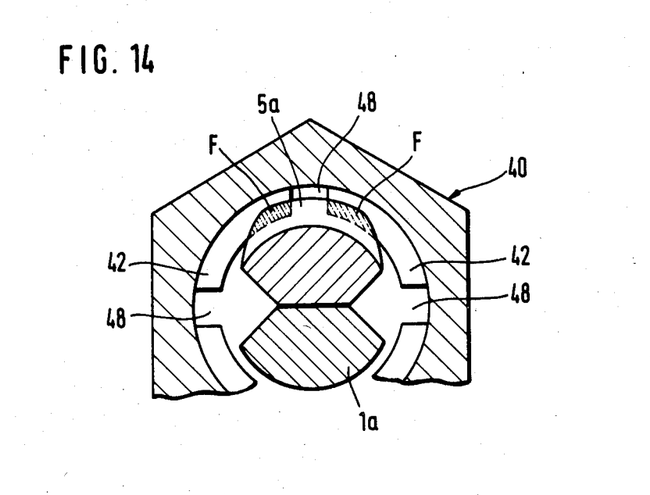
FIGS. 14 and 15 are sectional views taken transversely of the axial direction of the anchoring apparatus with the ribs formed on a two-part anchor rod and with interrupted projections formed in the nut.
Figure 15:
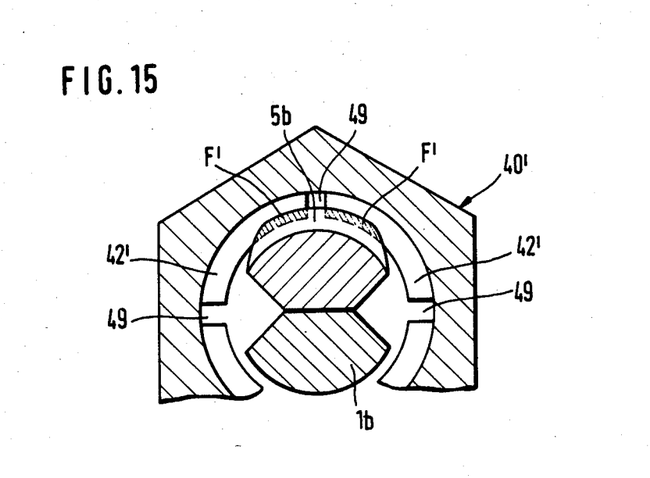
Figure 16:
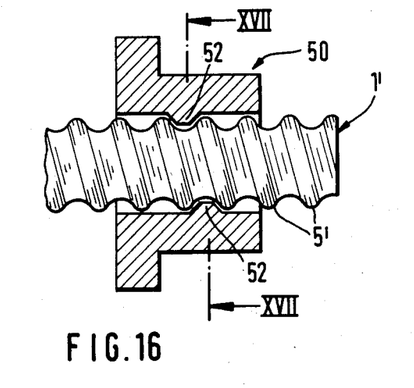
FIG. 16 is an axially extending view, partly in section, illustrating another embodiment of the anchoring apparatus according to the present invention.
Figure 17:
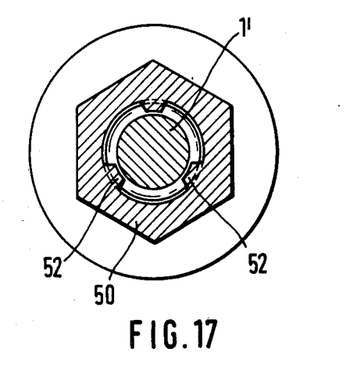
FIG. 17 is a cross-sectional view taken along the line XVII—XVII in FIG. 16.

Another possibility for defining the anchoring force or the sliding resistance, respectively, and at the same time to compensate for rolling tolerances generated during the production of the anchor rods in a hot rolling process, reference is made to FIGS. 14 and 15 displaying another arrangement of the anchor rod and the nut. In FIGS. 14 and 15, a two-part steel rod acts as the anchor rod with the outwardly facing surfaces on each of the rod parts being provided with force transmission ribs. In FIG. 14, an anchor rod 1a is displayed with ribs 5a extending for a relatively high radial dimension from the rib core and providing a positive tolerance in connection with an anchoring nut 40 having radially inwardly directed projections 42 with relatively wide spaces 48 between the projection sections. The spaces 48 are repeated along the inside circumference of the nut so that two of such spaces coincide with the ribs 5a on the rod 1a with the ribs located opposite one another. Accordingly, the anchoring force is transmitted between the ribs 5a and the projections 42 only within the region shown by the partial hatched surfaces F.

FIG. 15 shows a two-part anchor rod 1b, however, the ribs 5b have a relatively lesser radial dimension as compared to the arrangement in FIG. 14 providing a negative tolerance. In this arrangement, the spaces 49 between the projection sections 42' are narrower whereby the partial hatched surfaces F' where the anchoring force is transmitted correspond approximately to that in FIG. 14. For practical use, different types of anchoring nuts are provided so that it is possible, after determining the tolerance of an anchor rod, to provide a nut with corresponding dimensions.

In the embodiment of the present invention set forth in FIGS. 16 to 19, the parts forming the anchoring apparatus, that is the anchor rod 1' and the anchoring nut 50 are arranged to some degree in a manner opposite to that in the above-described embodiments. Anchor rod 1' has continuous force transmission ribs 5' with each rib forming a complete circumferentially extending thread while the inwardly directed projections on the nut 50 are formed only as cams 52 with the recesses 51 between adjacent cams forming thread valleys for receiving the ribs 5' on the anchor rod 1'.

Figure 18:
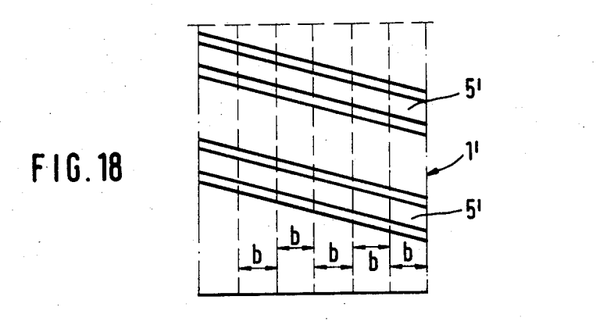
FIG. 18 is a partial developed view of the anchor rod displayed in FIG. 16.
Figure 19:
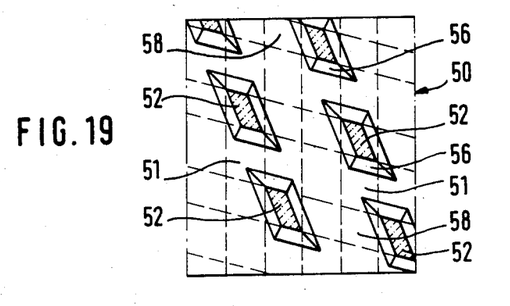
FIG. 19 is a partial developed view of the anchoring nut illustrated in FIG. 16.
Figure 20:
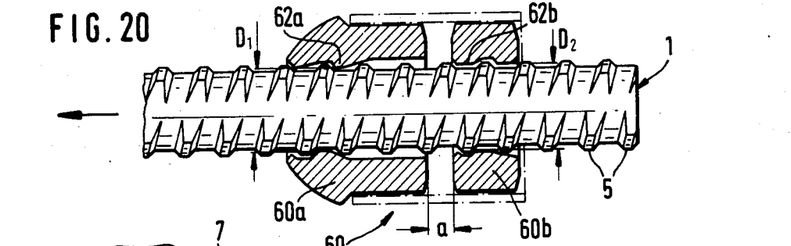
FIG. 20 is an axially extending view partly in section of yet another embodiment of the anchoring apparatus of the present invention with a two-part anchoring nut.

As exhibited by the developed views of the anchor rod 1', note FIG. 18, and of the anchoring nut 50, note FIG. 19, which views only show a part of the circumferential extent, an anchoring nut 50 with a cylindrical core borehole is provided with the thread valleys 51 provided subsequently and can be used as the anchoring nut. In the illustrated embodiment, the cams 52 are offset relative to one another in the axial direction of the nut 50. During the application of a tensile force on the anchor rod 1, its force transmission ribs 5' contact only the flanks 56 of the cams. When the predetermined axially extending anchor force is exceeded, the cams 52 on the nut 50 formed of a harder material than the anchor rod, penetrate into the material of the ribs 5' on the anchor rod 1' and thus cut a path, corresponding to the cam, in the rib. The width of the paths stripped off by the cams 52 is indicated by b in FIG. 18. The cams 52 are offset relative to one another, as shown in FIG. 19, so that when the nut 50 slides axially relative to a rib 5', the next cam strikes a different part of the rib 5' on the rod 1' which had not been stripped by the previously acting cam.

Figure 21:
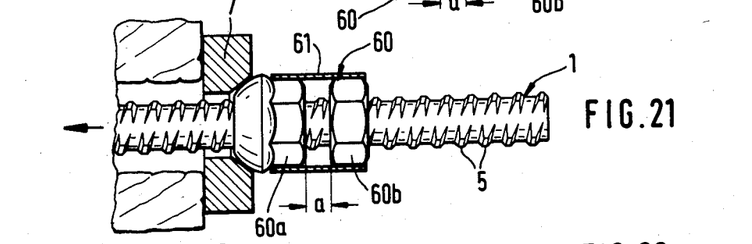
FIG. 21 illustrates the anchoring apparatus shown in FIG. 20 on a smaller scale, with the anchoring nut at the outset of its effectiveness.
Figures 22, 23, 24:
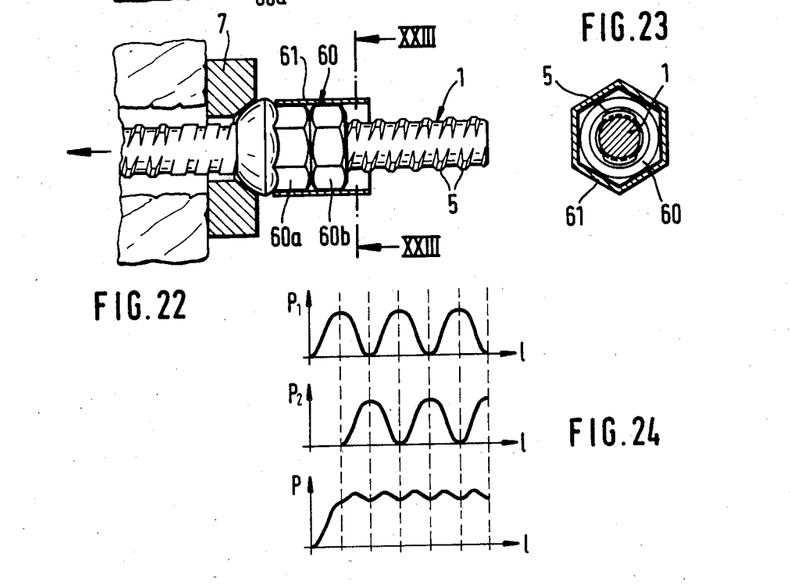
FIG. 22 displays the anchoring apparatus in FIG. 21 in the fully effective state.
FIG. 23 is a cross-sectional view taken along the line XVIII—XVIII in FIG. 22.
FIG. 24 is a graphical showing of the anchoring force of the two-part anchoring nut shown in FIG. 21 during the yielding of the anchoring apparatus.

A particularly advantageous arrangement for establishing a uniform sliding resistance of the anchoring apparatus in accordance with the present invention is set forth in FIGS. 20 to 23 in connection with an anchor rod 1 with force transmission ribs 5 and an anchoring nut 60 with a complete internal thread. The anchoring nut is formed of two complete axially extending parts 60a and 60b. Part 60a, as shown in FIGS. 21 and 22, has a surface in contact with the anchor plate 7 formed in a known manner with a dome or spherically rounded configuration affording it the ability to rotate in a conically widened hole in the anchor plate. The other part 60b of the anchoring nut has the configuration of a conventional nut. Each of the parts 60a, 60b has at least one complete thread turn so that it can be screwed on the anchor rod 1. The diameter $D_2$ of the part 60b of the nut remote from the load is somewhat greater than the diameter $D_1$ of the part 60a, note FIG. 20.

As shown in FIG. 21, at the commencement of the application of the load, the two parts 60a, 60b of the anchoring nut 60 are spaced apart in the axial direction at a distance a from one another. This dimension corresponds, in the illustrated embodiment, to approximately one-half of a revolution of the part 60b. In this embodiment, the two parts 60a, 60b are located in an axially extending sleeve 61 which prevents rotation of the parts, but permits axial displacement. When the load on the anchor rod 1 exceeds a predetermined value with relative movement between the anchor rod and the anchoring nut, note the direction of the load indicated by the arrow in FIGS. 20–22, the force transmission ribs 5 on the anchor rod 1 are first sheared off by the projections 62a on the part 60a with the part 60a being displaced by a distance a toward the other part 60b which, up to that point, has not been axially displaced. As the load acting on the rod increases, the projections 62b on the part 60b move into contact with the ribs 5 on the rod 1.

In this manner, by offsetting the thread turns on the parts 60a and 60b relative to the anchor rod 1 by a distance a, the anchoring force is made uniform. This is indicated by the graphical showing in FIG. 24. In FIG. 24, the graphical showing has an upper part, a middle part, and a lower part, with the upper part indicating the anchor force $P_1$ assigned to part 60a, the middle part with the anchor force $P_2$ assigned to part 60b of the composite anchoring nut 60. The anchor force in the axial direction of displacement is approximately sine-shaped and is controlled by the offset arrangement of the nut parts 60a, 60b whereby a wave crest of the anchor force $P_2$ occurs at a wave trough of anchor force $P_1$. In the superimposition of these two anchor forces, a substantially uniform curve of the overall anchor force P is achieved with only minor fluctuations occurring.

Figures 25, 26, 27:
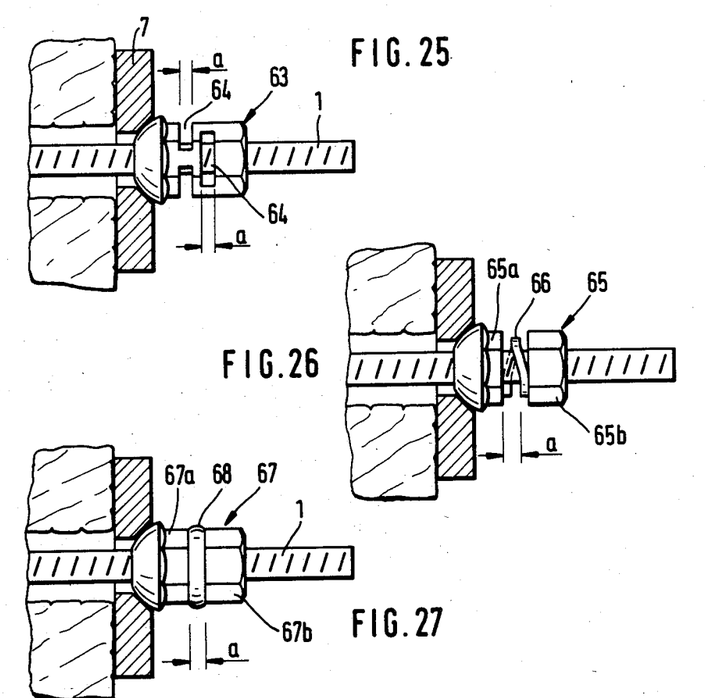
FIGS. 25, 26, and 27 are axially extending views, partly in section, of additional embodiments of a two-part anchoring nut.

In accordance with the requirements of the individual situation, an anchor rod can be made up of a plurality of parts arranged relative to one another in a corresponding manner. In FIGS. 25 to 27, additional embodiments for connecting two nut parts are provided so that they can be secured against rotation, but can be axially displaced relative to one another on the anchor rod. In FIG. 25, the nut 63 is weakened by providing transversely extending notches or cuts 64 which can be squeezed together when the predetermined load is exceeded. In FIG. 26, the two parts 60a and 60b are connected by a spring element 66; while in FIG. 27, the connection is provided by a compressible element 68, that is, an element with a rubber-elastic characteristic.

Figure 29:
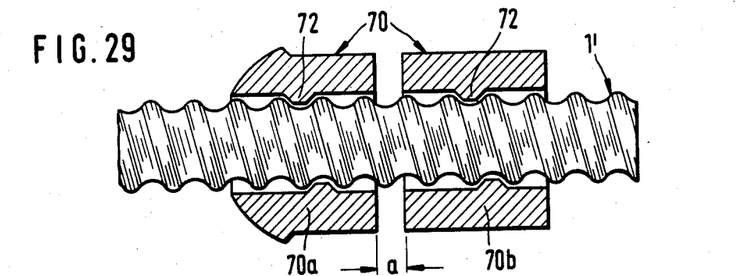
FIG. 29 is an axially extending view, partly in section, of another embodiment of the anchoring apparatus with a two-part anchoring nut.
Figure 30:
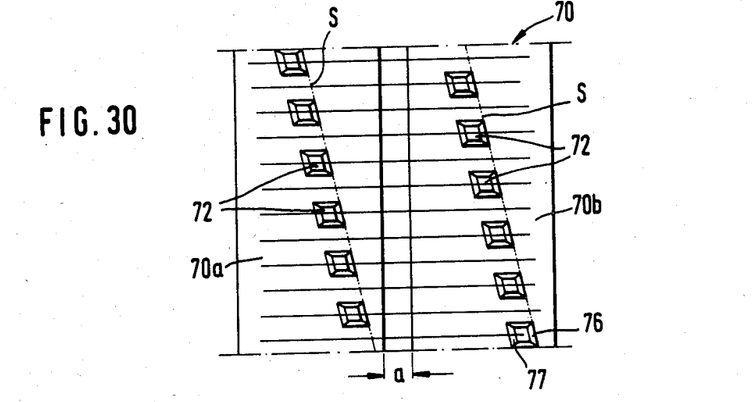
FIG. 30 developed view of the inside circumference of the anchoring nut shown in FIG. 29.

While the anchoring apparatus according to FIGS. 20 to 24 is suitable for an anchor rod 1 with force transmission ribs forming a partial or interrupted thread, an anchoring apparatus as shown in FIGS. 29 and 30 includes an anchoring nut 70 formed of two axially extending parts 70a and 70b following one another in the axial direction. On the inside circumferential surface of the nut parts, cams 72 are formed extending inwardly for engagement with the thread formed by the continuous ribs on the anchor rod 1'. As set forth in the developed view of FIG. 30, the cams are approximately square in outline, and the flanks 76 directed toward the load are exactly the same dimensions as the flanks remote from the load. It is also possible to provide the cams with a trapezoidal or wedge-shaped configuration with the flanks 76 directed toward the load being narrower than the flanks 77 remote from the load, or the cams can be provided with one wedge tip. The lateral surfaces are then inclined outwardly relative to the force direction and afford additional uniformity of the sliding resistance.

Figure 31:
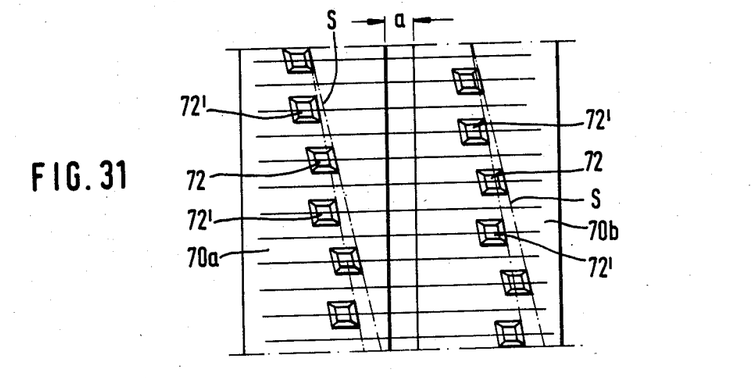
FIG. 31 is a developed view, corresponding to FIG. 30, with the cams shown offset relative to one another in the axial direction of the nut.

In the embodiment displayed in FIG. 30, the cams are located along a helical line S, indicated by a broken line as the connecting line of the flanks 76 facing toward the load. In FIG. 31, similar to FIG. 30, the cams 72 are offset relative to one another in the direction of force with respect to the helical line S. When helical line S also indicates a flank of the force transmission ribs of the anchor rod 1' formed by a continuous thread, then the cams 72' offset relative to the helical line S effect a force locking engagement with a delay relative to the cams 72 located along the helical line S so that additional uniformity of the sliding resistance is provided.

One problem of such a yieldable anchoring of the type described above is that for providing the requisite yieldability, the anchor rod projects outwardly from the surface to be anchored and outwardly from the opening to the borehole. As a result, the clear or open space within a tunnel, drift or the like is reduced. Since the anchoring apparatus in accordance with the present invention operates in a maintenance-free manner, it is possible to locate the anchoring element in the borehole itself, that is, with the anchoring element countersunk at the opening to the borehole, as shown in FIG. 28, or located toward the base of the borehole, as set forth in FIG. 4.

Figure 28:
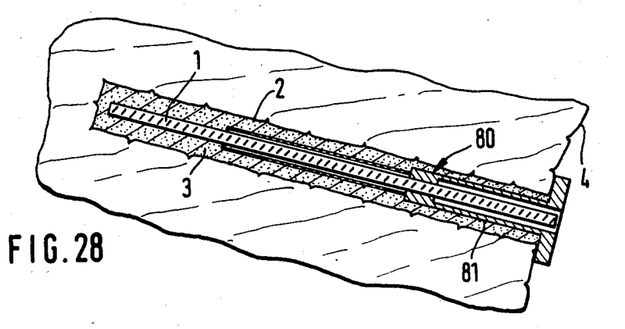
FIG. 28 is an axially extending sectional view, similar to FIG. 1, of a rock anchor with the anchoring apparatus located at the open end of the borehole.

FIG. 28 corresponds in all essential features to the embodiment of FIG. 1 with the exception that the anchoring nut 80 does not project outwardly from the surface 4 of the rock which tends to move, rather it is countersunk in the borehole opening and is supported relative to the anchor plate 7 by a tubular section 81 for resisting tensile force. Accordingly, the entire length of the anchor rod 1 within the anchor pipe 81 is available for the yieldability of the anchor.

Figure 4:
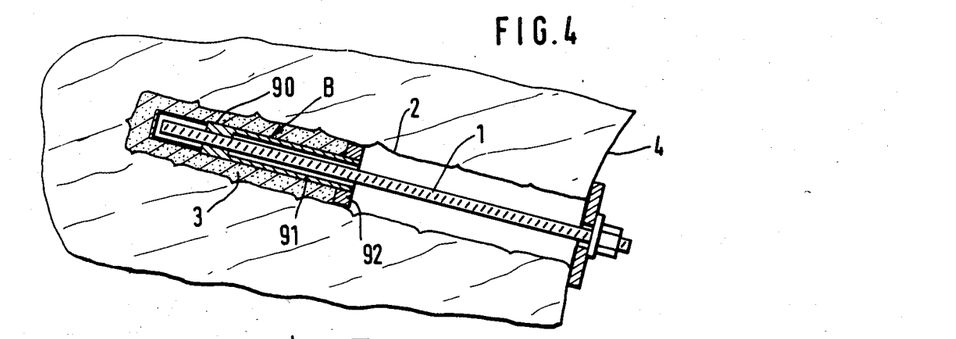
FIG. 4 is an axially extending sectional view through a rock anchor similar to that shown in FIG. 1, however, with the anchoring apparatus spaced toward the bottom of the borehole.
Figures 5, 6:
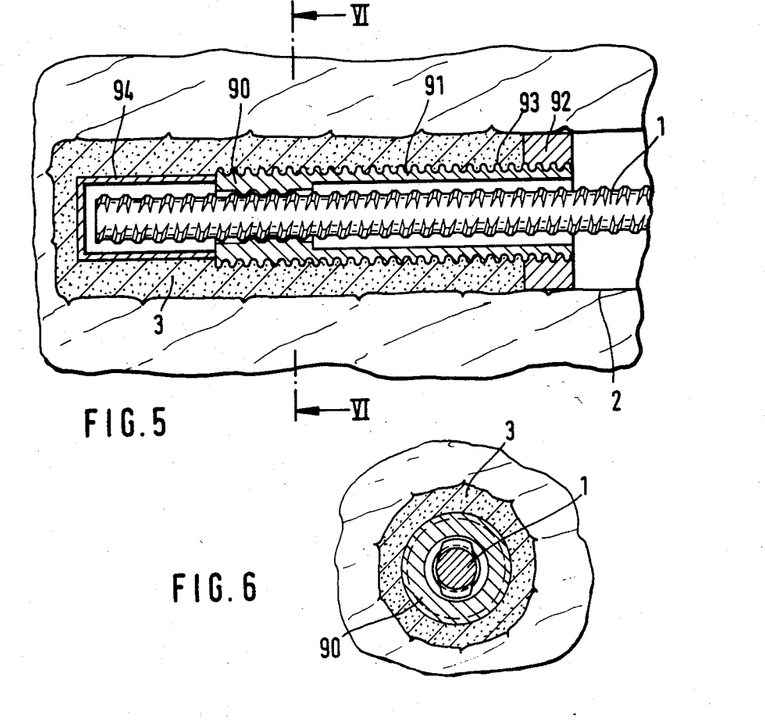
FIG. 5 is an axially extending sectional view on an enlarged scale of the anchoring apparatus shown in FIG. 4.
FIG. 6 is a transverse sectional view taken along the line VI—VI in FIG. 5.

In the embodiment depicted in FIG. 4, an anchoring nut 90 is located in the inner part of the borehole 2 secured within a bonding member 3 forming the anchored length of the anchor rod 1. A tubular section 91 extends from the anchoring nut 90 to an annular sealing or packing member 92 defining the outer end of the bonding member 3. To improve the bonding action of the material forming the bonding member 3 with the anchoring nut 90 and the tubular section 91, the outer surfaces of these parts are provided with a profiled surface 93, note FIG. 5. The end of the anchor rod required for the yieldability of the anchoring apparatus is enclosed in a sheathing 94 to prevent the end of the rod from being gripped by the bonding member 3.

While specific embodiments of the invention have been shown and described in detail to illustrate the application of the inventive principles, it will be understood that the invention may be embodied otherwise without departing from such principles.

We claim:

1. Anchoring apparatus for insertion into a borehole in a rock stratum for supporting an exposed rock surface or wall such as in a rock tunnel or a rock excavation, comprising a tension member in the form of an axially elongated steel anchor rod formed of at least one axially extending part with force transmission ribs on the outer surface of said rod and said rod having a pair of opposite ends spaced apart in the axial direction, said ribs located along a helically extending line around the axis of said rod and forming at least a partial thread, an anchoring element mounted on said rod, said anchoring element having an inside surface arranged to encircle and engage the surface of said rod, said inside surface having inwardly directed projections, said projections forming grooves therebetween so that said grooves can receive said ribs on said rod with said projections arranged to contact said ribs, said anchoring element in engagement with said rod being arranged to be axially movable relative to said rod while a predetermined axially directed tensile force on said rod is exceeded, wherein the improvement comprises that said anchoring element is formed of a material having a higher strength than the material forming said rod, said projections have flanks defining said grooves therebetween arranged to contact said force transmission ribs, and when the predetermined axially directed tensile force is exceeded, during relative axial movement between said anchoring element and said rod, said projections on said anchoring element cut and displace the portion of said force transmission ribs contacted by the flanks of said projections.

2. Anchoring apparatus, as set forth in claim 1, wherein said anchoring element is in the form of a nut with an inside surface defining an axially extending opening therethrough, said projections located on the inside surface of said nut and forming at least a partial thread and said recesses between said projections defining grooves arranged to receive said force transmission ribs on said anchor rod so that said nut and said anchor rod are in threaded engagement.

3. Anchoring apparatus, as set forth in claim 2, wherein said projections form consecutive thread turns in said anchoring nut with said projections each forming a complete thread turn, said anchoring nut having a first end and a second end spaced apart in the axial direction thereof, said projections extending radially inwardly adjacent one end of said anchoring nut being closer to the axis of said nut than said projections adjacent the other end thereof, said force transmission ribs having oppositely directed flanks, and the flanks of said projections acting on the flanks of said force transmission ribs so that during relative movement when the predetermined axially directed tensile force is exceeded layers of said force transmission ribs can be stripped in a stepwise manner.

4. Anchoring apparatus, as set forth in claim 3, wherein said force transmission ribs on said anchor rod are inclined relative to the outside surface of said rod, said flanks on said anchoring element directed toward said force transmission ribs on said anchor rod in the direction of relative movement of said anchoring nut with respect to said anchor rod have the same or a steeper inclination relative to the axis of said anchor rod than the corresponding flanks on said force transmission ribs of said anchor rod whereby said force transmission ribs can be sheared off by the edges defined by the juncture of said flanks and the radially inner surface of said projections.

5. Anchoring apparatus, as set forth in claim 4, wherein said flanks on said projections contacting said flanks on said force transmission ribs on said anchor rod during relative movement extend perpendicularly relative to the axis of said anchor rod.

6. Anchoring apparatus, as set forth in claim 3, wherein said force transmission ribs on said anchor rod have flanks inclined obliquely relative to the outside surface of said rod and said flanks on said projections contacting said flanks on said force transmission ribs during axial movement when the predetermined tensile force is exceeded are inclined at a smaller angle relative to the axis of said anchor rod than the flanks on said force transmission ribs whereby the shearing action effected on said force transmission ribs by said projections effects a cold forming of said force transmission ribs.

7. Anchoring apparatus, as set forth in claim 3, wherein said projections on said anchor rod extend helically and are in spaced relation to one another in the helical direction.

8. Anchoring apparatus, as set forth in claim 6, wherein said projections on said anchor rod extend helically and are in spaced relation to one another in the helical direction.

9. Anchoring apparatus, as set forth in claim 7, wherein the spacings between said projections are flush with one another in the axial direction of said anchoring nut.

10. Anchoring apparatus, as set forth in claim 8, wherein the spacings between said projections are flush with one another in the axial direction of said anchoring nut.

11. Anchoring apparatus, as set forth in claim 2, wherein said projections on said anchoring nut are formed as individual cams mutually spaced apart along a helical line on the inside surface of said nut so that said cams form a partial thread and said cams having flanks directed toward said force transmission ribs so that said flanks contact said ribs in the relative axial movement of said anchoring nut relative to said anchor rod when the predetermined axially directed tensile force is exceeded and said force transmission ribs form complete thread turns whereby said cams shear off portions of said force transmission ribs in the spaced direction of said cams along the helical line.

12. Anchoring apparatus, as set forth in claim 11, wherein said cams are uniformly spaced along said helical line.

13. Anchoring apparatus, as set forth in claim 11, wherein said cams located on adjacent thread turns in the axial direction of said anchoring nut being offset relative to one another in the circumferential direction of said nut.

14. Anchoring apparatus, as set forth in claim 12, wherein said cams located on adjacent thread turns in the axial direction of said anchoring nut being offset relative to one another in the circumferential direction of said nut.

15. Anchoring apparatus, as set forth in claim 13, wherein said cams are offset relative to one another so that they appear adjacent to one another in the normal projection of said anchoring nut.

16. Anchoring apparatus, as set forth in claim 14, wherein said cams are offset relative to one another so that they appear adjacent to one another in the normal projection of said anchoring nut.

17. Anchoring apparatus, as set forth in claim 11, wherein said cams are offset relative to one another in the axial direction of said anchoring nut along the helical line formed by said cams.

18. Anchoring apparatus, as set forth in claim 13, wherein said cams are offset relative to one another in the axial direction of said anchoring nut along the helical line formed by said cams.

19. Anchoring apparatus, as set forth in claim 17, wherein each of said cams is offset relative to the adjacent said cams by the same dimension.

20. Anchoring apparatus, as set forth in claim 18, wherein each of said cams is offset relative to the adjacent said cams by the same dimension.

21. Anchoring apparatus, as set forth in claim 11, wherein said cams having lateral surfaces extending transversely of the flanks thereon which contact the flanks of said force transmission ribs with said surfaces extending at an oblique angle relative to the axial direction of said anchoring nut.

22. Anchoring apparatus, as set forth in claim 21, wherein said cams are wedge shaped as viewed in the direction said cams move relative to said force transmission ribs on said anchor rod when the predetermined axially directed tensile force is exceeded.

23. Anchoring apparatus, as set forth in claim 4, wherein said anchoring nut is formed of at least two axially extending annular parts spaced apart in the axial direction of said nut and each said part being capable of threaded engagement with said force transmission ribs on said anchor rod, said parts being arranged so that they are not rotatable relative to one another but are axially displaceable relative to one another by a predetermined distance in the axial direction while the predetermined axially directed tensile force is exceeded.

24. Anchoring apparatus, as set forth in claim 23, wherein said parts of said anchoring nut have an outside surface other than a circular surface and said parts being enclosed laterally by a sleeve having the cross-section of the inside surface thereof corresponding to the outside surface of said parts.

25. Anchoring apparatus, as set forth in claim 23, wherein an intermediate piece interconnects said parts of said anchoring nut and prevents relative rotation therebetween, and said intermediate piece being deformable in the axial direction of said anchoring nut.

26. Anchoring apparatus, as set forth in claim 1, wherein said anchor rod has a first end arranged to be positioned within the borehole in the rock stratum and a second end arranged to be located outside of the borehole, and said anchoring element is engageable on the end of said anchoring rod located outside the borehole and an anchor plate positioned between said anchoring element and the outside surface of said rock stratum.

27. Anchoring apparatus, as set forth in claim 1, wherein said anchor rod is located within said borehole with one end of said rod located adjacent to the opening to the borehole and a second end spaced inwardly therefrom toward the base of the borehole, and said anchoring element is engageable with said anchor rod on the end thereof adjacent the base of said borehole, and a bonding member securing said anchoring element within said borehole.

* * * * *